March 27, 1951 A. D. WETZEL 2,546,326
MACHINE TOOL
Filed July 29, 1947 2 Sheets-Sheet 1

INVENTOR.
ARTHUR D. WETZEL
BY
Kwis, Hudson, Boughton & Williams
ATTORNEYS

March 27, 1951 — A. D. WETZEL — 2,546,326
MACHINE TOOL
Filed July 29, 1947 — 2 Sheets-Sheet 2
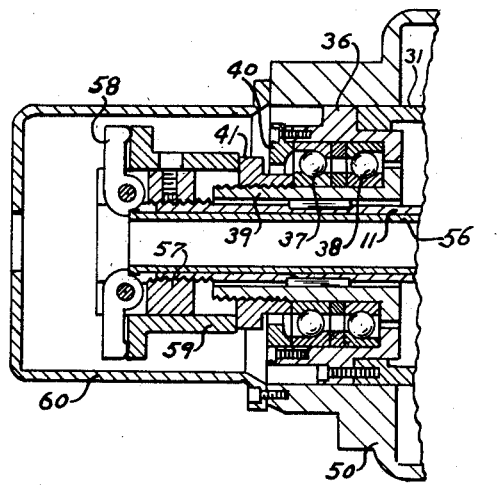
Fig.2
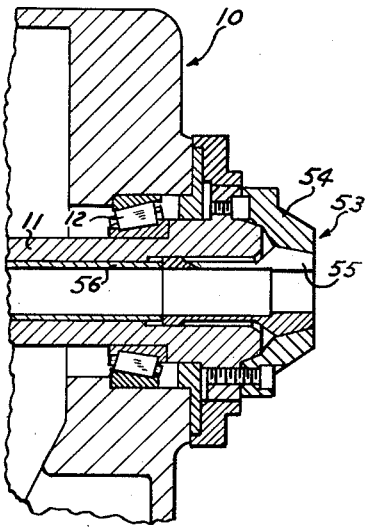
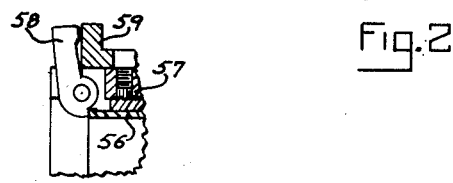
Fig.2A
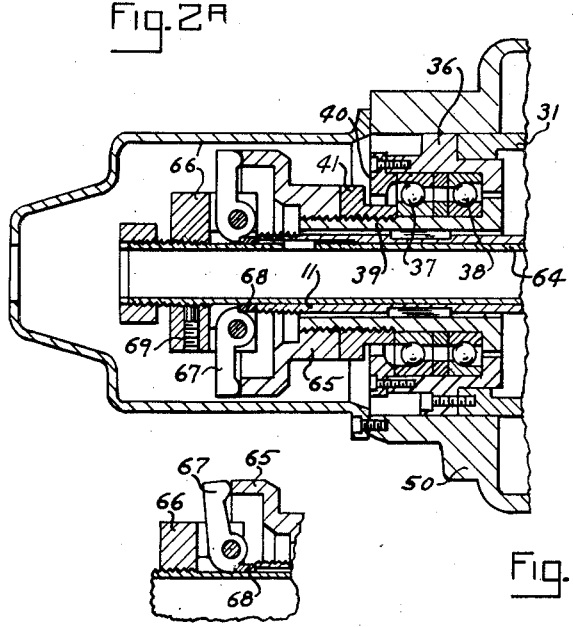
Fig.3
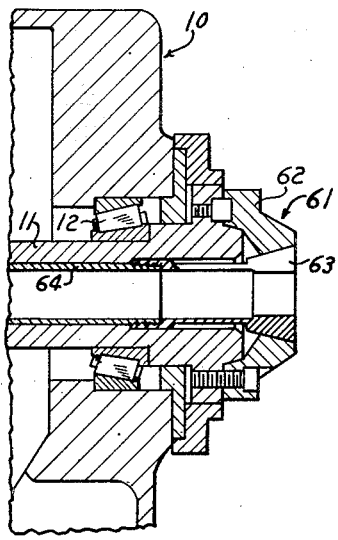
INVENTOR.
ARTHUR D. WETZEL
BY
Kwis, Hudson, Boughton & Williams
ATTORNEYS Patented Mar. 27, 1951

2,546,326

UNITED STATES PATENT OFFICE 2,546,326

MACHINE TOOL

Arthur D. Wetzel, Hudson, Ohio, assignor to The Warner & Swasey Company, Cleveland, Ohio, a corporation of Ohio Application July 29, 1947, Serial No. 764,281

14 Claims. (Cl. 279—4)

This invention relates to a machine tool and more particularly to a novel chuck actuating mechanism for a machine tool.

An object of the invention is to provide a novel and improved fluid pressure operated mechanism for actuating a chuck of a machine tool, and a housing for the mechanism so constructed and arranged that it cooperates with the mechanism to provide a bearing support therefor.

Another object of the invention is to provide a novel and improved fluid pressure operated mechanism for actuating a chuck of a machine tool, the mechanism being so constructed and arranged that it cooperates with a housing therefor to provide a bearing support for the spindle upon which the chuck is mounted.

A further object of the invention is to provide a novel and improved fluid actuated mechanism for operating the chuck of a machine tool in which the piston and cylinder of the said actuating mechanism are non-rotatable and a means is provided for connecting the piston to the chuck, the said means including bearing means to permit relative rotation between said chuck and piston, the said bearing means being supported in axial alignment with the spindle and chuck by a portion of a housing which is attached to the headstock of the machine tool and encloses the said mechanism.

A still further object of the invention is to provide a novel and improved fluid actuated means for operating the chuck of a machine tool, the said means being so constructed and arranged that it may be readily adapted to operate a universal chuck, or a collect chuck of either the draw-back or push-out types.

The invention further resides in certain novel features of construction, and combination and arrangement of parts, and further objects and advantages thereof will be apparent to those skilled in the art to which it pertains from the following description of the present preferred embodiment thereof and certain modifications, described with reference to the accompanying drawings in which similar reference characters represent corresponding parts throughout the several views and in which:

Fig. 2 is a fragmentary sectional view of a fluid actuating mechanism constructed in accordance with this invention and adapted for use in operating a collet chuck of the push-out type;

Fig. 2A is a fragmentary sectional view of a portion of the structure shown in Fig. 2 and illustrating one of the collet chuck sleeve actuating fingers or levers in its operated position;

Fig. 3 is a view similar to Fig. 2 and illustrating the novel and improved fluid actuated mechanism adapted to operate a collet chuck of the draw-back type, and Fig. 3A is a fragmentary sectional view of a portion of the structure shown in Fig. 3 and illustrating one of the collect chuck sleeve actuating fingers or levers in its operated position.

Figure 1:
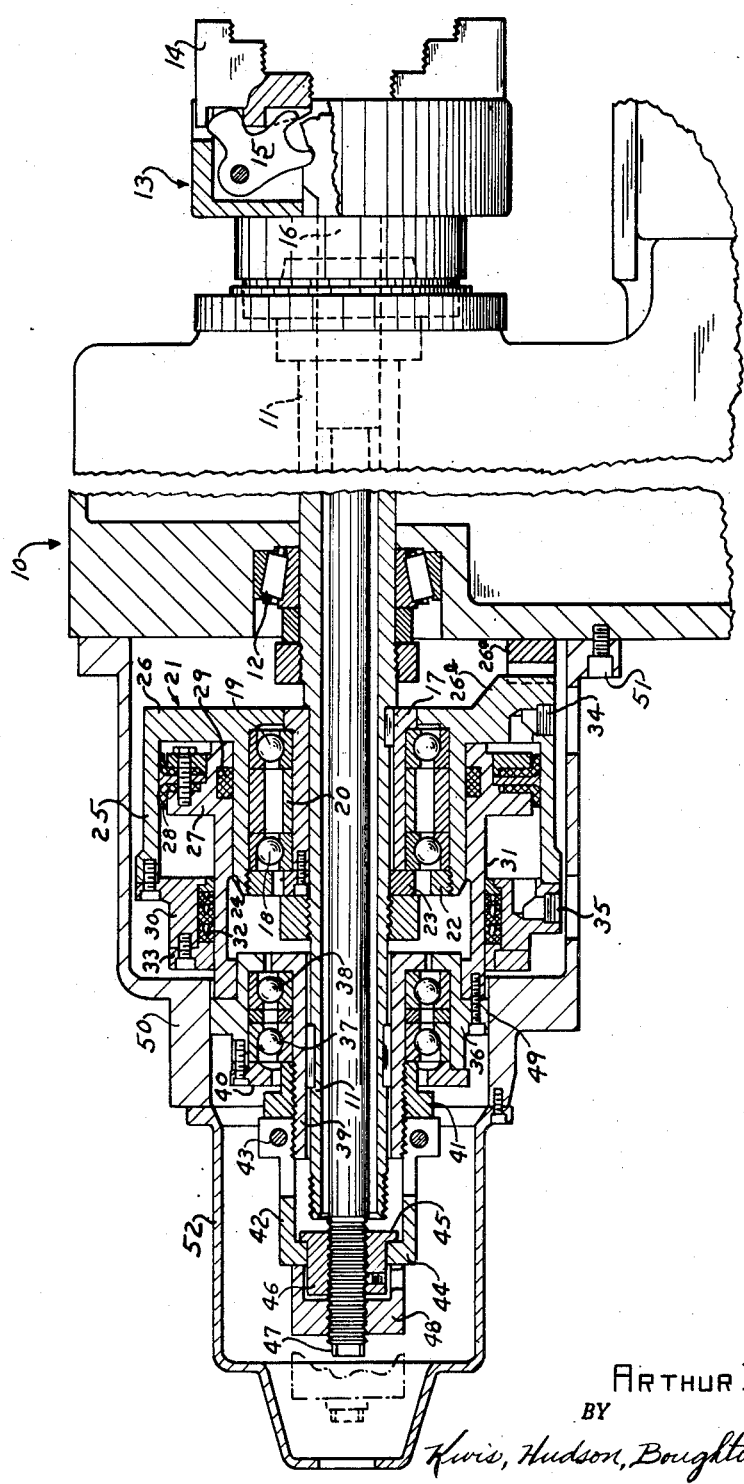
Fig. 1 is a fragmentary view, partly in section and partly in side elevation, of a headstock of a machine tool showing the novel and improved fluid actuated chuck mechanism of this invention cooperating with a housing therefor and with the spindle of the machine tool to act as an outboard bearing for the latter and to operate a universal chuck carried thereby.

Referring first to Fig. 1 of the drawings, the reference numeral 10 designates generally the headstock of a machine tool in which the spindle 11 is rotatably journalled by means of bearings 12. The forward end of the spindle is provided with a chuck of the universal type, generally designated 13. This chuck comprises the usual radially movable jaws 14 which are actuated by bell crank levers 15 in response to axial movement of an actuating member or rod 16 extending through the hollow interior of the spindle 11, the bell crank levers 15 being pivoted within the body of the chuck and having their opposite ends cooperating with the jaws 14 and the rod 16 in the conventional manner. The rear portion of the spindle 11 projects into the headstock 10, where it is provided with the usual driving gears not shown. The spindle also projects beyond the rear of the headstock 10 for support by and cooperation with the novel fluid actuated means about to be described.

The illustrated embodiment of the novel chuck operating means comprises a sleeve 17 keyed to the spindle 11 and forming a support for the inner race of ball bearings 18 and 19 which are spaced by a separator 20. The outer races of the bearings 18 and 19 are mounted in the central bore of a non-rotatable annular member 21, the bearings being retained between the member 21 and the sleeve 17 by the retaining rings 22 and 23. The annular member 21 has spaced cylindrical walls 24, 25 and an end wall 26 thereby forming an annular cylinder within which is slidably disposed a non-rotatable annular piston 27. The piston 27 is provided with packing means 28, interposed between the piston and the outer wall 25 of the cylinder, and with a packing ring 29 riding upon the inner wall 24 of the cylinder. The outer edge of the outer wall 25 of the cylinder is provided with a removable cap or end wall member 30 between which and a cylindrical extension 31 of the piston is provided a packing 32, the latter being held in place by an annular ring 33 secured to the cap or end wall 30. The cylinder 21 is provided with ports 34 and 35 for conducting pressure fluid to opposite sides of the piston 27, these ports being adapted to be connected with a source of fluid under pressure, not shown, for effecting movement of the piston in either direction to effect operation of the chuck 13 as hereinafter described. The cylinder is held from rotation by means of a substantially U-shaped member 26a attached to the rear of the headstock 10 and straddling an outwardly projecting integral lug 26b provided upon the rear wall 26 of the cylinder.

The cylindrical extension 31 of the piston is connected with a sleeve 36 which forms a support for the outer race of a pair of ball bearings 37 and 38. The inner races of these bearings are supported by a member or sleeve 39 which is slidably keyed with the spindle 11 to rotate therewith and slide with respect thereto. The sleeves 36 and 39 are held in alignment by the action of the bearings 37 and 38, the bearings being retained in their proper positions by virtue of an inwardly directed flange on one end of the sleeve 36 cooperating with an outwardly directed flange upon the corresponding end of the sleeve 39, and by means of retaining rings 40 and 41 adjacent the other ends of the sleeves, the sleeve 41 being screwed upon a threaded extension of the sleeve 39 to provide for proper adjustment of the bearings 37 and 38.

The outer end of the threaded extension of the sleeve 39 threadably receives a cylindrical shouldered sleeve 42, the threaded portion of which is axially slotted and provided with clamping screws 43 to effect locking of the sleeve in its adjusted position upon the sleeve 39. The outer end of the sleeve 42 has an inwardly directed flange 44 which cooperates with a flange 45 upon a threaded collar 46 forming one part of a two-part locking device, the collar 46 being screwed upon the threaded outer end of the actuating member or rod for the chuck mechanism. The extremity of the rod 16 is provided with a polygonally shaped surface 47 for reception of a wrench or similar tool to permit the position of the threaded collar 46 to be accurately adjusted with respect to the rod 16 after which a locking nut 48 is threaded upon the outer end of the rod 16. The nut 48 and the flange 45 of the collar 46 cooperate with the flange 44 of sleeve 42 to lock the rod 16 in adjusted position against lengthwise or rotative movement with respect to the sleeve 42.

It will be seen, from the construction just described, that when fluid pressure is applied through the port 34 the piston 27 is moved to the left, as viewed in Fig. 1, thereby moving the sleeves 36 and 39 to the left. Movement of the sleeve 39 is transmitted through the sleeve member 42, nut 48, and collar 46 to the rod 16 thus causing the latter to likewise move to the left thereby rocking the bell crank levers 15 so as to move the jaws 14 radially inward and grip the work. Application of fluid pressure to the port 35, and employing the port 34 as an exhaust causes the piston to move in the opposite direction, thereby causing the actuating rod 16 to move to the right rocking the levers in the direction for moving the jaws 14 outwardly and thereby releasing the work.

It will be observed that the chuck 13 and spindle 11 are freely rotatable without rotation of the cylinder 21 or the piston 27. This is made possible by virtue of the bearings 18, 19, 37 and 38 and by means of the substantially U-shaped member 26a which is secured to the headstock 10 and extends on either side of the projecting lug 26b provided upon the rear wall 26 of the cylinder 21. The bearings 37 and 38 in cooperation with the sleeves 36 and 39 also provides an outboard bearing support for the spindle 11. This is due to the fact that the sleeve 36 has a flange portion 49 which has a carefully machined surface cooperating with a corresponding machined bore in a housing 50 which surrounds the fluid actuated mechanism and is attached to the headstock 10 by means of screws 51, the sleeve 36 being slidably supported in the machined bore of the housing. The outer end of the housing 50 is provided with a cover member 52 which encloses the end of the operating rod 16 and the locking device secured thereto.

In Figs. 2 and 2A there is illustrated a fluid operated mechanism similar to that shown in Fig. 1 but adapted for operation of a collet chuck of the push-out type. Since the fluid operated mechanism is constructed in the same manner as that illustrated in Fig. 1 only so much thereof is here illustrated and described as is necessary to an understanding of the manner in which it is adapted for use with a collet chuck. As before, the spindle 11 is journalled by means of bearings 12 in the headstock 10 of the machine tool. The forward end of the spindle is now provided, however, with a collet chuck of the push-out type, generally designated 53, which comprises the usual hood 54 and the resilient jaws 55, the latter being actuatable by the collet chuck actuating member or sleeve 56 which extends through a bore in the spindle 11 and has sliding support therein.

The spindle 11 projects beyond the rear of the headstock 10 and is provided with the fluid operated mechanism constructed in the same manner as that shown in Fig. 1. In this instance, however, the threaded extension of the sleeve 39 is not provided with the flanged sleeve 42. Instead, the outer threaded end of the spindle 11 is provided with a carrier or housing 57 which pivotally supports a plurality of collet sleeve actuating fingers or levers 58. The heel portions of these levers 58 are in abutting engagement with the outer end of the sleeve 56, and the relatively long arms of the levers are engaged by a slidable flanged sleeve 59. This sleeve 59 is slidably mounted upon a portion of the lever housing or carrier 57 and is adapted to be moved by virtue of its abutting relationship with the retaining ring 41 which is screwed upon the sleeve 39, it being remembered that the sleeve 39 is axially moved by operation of the piston 27.

The construction is such that when the piston and piston extension 31 are moved to the left, as viewed in Fig. 2, the sleeve 39, which is likewise moved, causes the retaining ring 41 to move the sleeve 59 in the same direction. The sleeve 59, being in abutment with the long arms of the levers 58, rocks the said levers to a position substantially as shown in Fig. 2A. Hence, the heels of the levers, which are in abutment with the collet actuating sleeve 56, move the latter to the right, as shown in Fig. 2, forcing the jaws 55 of the collet chuck slightly to the right. This effects inward movement of the jaws, by virtue of the camming surface provided between the exterior surface thereof and the interior conical surface of the hood 54, to grip the stock placed therein. When the piston is operated in the reverse direction, by application of fluid pressure on the other side thereof, the sleeve 39 and retaining ring 41 return to their initial position. The natural resiliency of the jaws 55 of the collet chuck now forces the actuating sleeve 56 back to its initial position thereby returning the levers 58 to their positions as shown in Fig. 2.

In order to vary the action of the jaws 53, to effect gripping of workpieces or stock of slightly different size, the position of the finger or lever housing 57 may be adjusted upon the threaded outer end of the spindle 11, the housing 57 being locked in its adjusted position by means of a set screw carried by the housing 57 and cooperating with the spindle 11. The fluid actuated mechanism in this embodiment is supported in a housing 50 in the same manner as that illustrated in Fig. 1 and acts in a similar manner to provide an outboard bearing for the spindle 11. The end of the housing 50 is provided with a closure member 60 of any suitable shape to enclose the collet sleeve actuating fingers or levers and the associated mechanism.

In Figs. 3 and 3A of the drawings there is illustrated a fluid operated mechanism constructed in accordance with the invention and similar to that illustrated in Fig. 1 but adapted for use with a collet chuck of the draw-back type. The fluid actuated mechanism of this modified construction is of the same type as and constructed similar to that illustrated in Fig. 1 and hence is not illustrated or described in detail. As before, the spindle 11 is rotatably supported within the headstock 10 by means of bearings 12. Now, however, the forward end of the spindle is provided with a collet chuck of the draw-back type, generally designated 61, comprising a hood 62 and resilient jaws 63. The spindle 11 is provided with an axially extending bore which receives and supports the collet chuck actuating sleeve 64, this sleeve having a threaded connection with the resilient jaws 63. The spindle 11 projects beyond the headstock 10, to the rear thereof, and this projecting portion is provided with the fluid actuating mechanism. As before, this mechanism includes the sleeve 39 which is rotatable with the spindle 11 and is axially movable by operation of the piston within the fluid actuated mechanism, the cylindrical extension 31 of the piston being operatively connected with the sleeve 39 through the bearings 37 and 38, so that the cylindrical extension 31 of the piston may produce axial movement of sleeve 39 without the rotation of the latter being transmitted to the former.

The threaded outer end of the sleeve 39 is provided with a cup-shaped member 65, while the projecting end of the collet actuating sleeve 64 is threaded and provided with a finger or lever housing or carrier 66 which pivotally supports a plurality of radially extending fingers or levers 67. The outer end of the spindle 11 is provided with an abutment collar 68 against which the heels or relatively short arms of the fingers or levers 67 abut to provide the fulcrums for the fingers or levers 67 which, in the construction shown, constitute levers of the second class, the longer arms of the levers being in abutting relationship with the cup-shaped member 65 and adapted to be moved thereby.

It will now be understood, from the construction just described, that when fluid pressure is applied to the fluid actuating means in a direction causing the piston thereof to move to the left, as viewed in the drawings, the cylindrical extension 31 of the piston causes the sleeve 39 to likewise be moved to the left carrying with it the cup-shaped member 65. This member 65, by virtue of its engagement with the longer arms of the levers or fingers 67, rocks the latter about their fulcrums, provided at the hardened ring 68, to the positions corresponding to those illustrated in Fig. 3A. This causes the finger or lever housing 66 to move to the left, as viewed in the drawings, by virtue of the pivotal connection between the fingers or levers and their housing. This movement of the housing 66 causes the collet chuck actuating sleeve 64 to likewise move to the left thereby causing the resilient jaws 63 of the chuck to be forced into engagement with the stock placed in the chuck by virtue of the cooperation of the camming surface on the exterior of the jaws with the conically shaped surface in the hood 62. When fluid pressure is applied to the fluid actuated means to operate the piston thereof in a reverse direction, the sleeve 39 and the cup-shaped member 65 are moved to the right, as viewed in Fig. 3, thus enabling the levers or fingers 67 to rock in the reverse direction under the influence of the resilient action of the jaws 63, thereby releasing the grip of the chuck upon the workpiece or stock.

In order to vary the action of the jaws 63, to effect gripping of workpieces or stock of slightly different size, the finger or lever housing 66 may be adjusted upon the actuating sleeve 64, the housing 66 being locked in its adjusted position by means of a set screw or the like 69 carried by the housing and cooperating with the sleeve 64. The fluid actuated mechanism is enclosed within a housing which cooperates with the sleeves 36, 39 and the bearings 37 and 38 to provide an outboard bearing for the spindle 11 as described before. The outer end of the mechanism is enclosed by a suitable housing of any desired type, the one illustrated being similar to that shown in Fig. 1.

It will now be apparent that the fluid actuated means of this invention provides a highly effective means for operating chucks of various types and is readily adaptable for use in operating a variety of different type of chucks without requiring basic modification in the structure of the fluid actuated means per se, the mechanism being readily adapted for use with different type of chucks by merely changing the actuating mechanism connected therewith. Moreover, the novel and improved fluid actuated mechanism also provides an outboard bearing support for the spindle of the machine tool thus increasing the rigidity of the latter.

Other advantages of the invention will be readily apparent to those skilled in the art, and since numerous changes and adaptations can be made in the embodiments thereof without departing from the basic concepts of the invention, the latter is not to be considered as limited to the exact details of construction herein illustrated and described but only as required by the spirit and scope of the appended claims.

Having thus described my invention, I claim:

1. A chuck operating mechanism for a machine tool having a headstock and a hollow spindle journalled therein with the forward end of the spindle equipped with a chuck, the said mechanism comprising a housing rigidly attached to said headstock at the rear thereof, a non-rotatable cylinder supported within said housing, a piston reciprocable in said cylinder, the said cylinder having ports on either side of said piston to permit the alternate introduction and exhaust of a fluid under pressure for effecting movement of the piston, a chuck actuating member extending through the bore of said spindle and rotatable therewith, means operatively connecting said member with said piston including bearing means coaxial with the spindle for permitting relative rotation between said member and piston, the said connecting means having portions thereof slidable upon an internal surface of said housing and upon a part of the external surface of said spindle respectively, whereby the said housing encloses the operating parts of said mechanism and cooperates with the means connecting said member and piston to provide a supporting bearing for the said connecting means and for said spindle.

2. A chuck operating mechanism for a machine tool having a hollow spindle journalled in the headstock thereof with the forward end of said spindle equipped with a chuck and the rear end of said spindle projecting beyond said headstock, the said mechanism comprising a non-rotatable cylinder positioned at the rear of said headstock and coaxial with said spindle, a piston reciprocable within said cylinder, the said cylinder having ports on either side of said piston to permit the alternate introduction and exhaust of a fluid under pressure for effecting movement of the piston, a chuck actuating member extending through the bore of said spindle, means operatively connecting said chuck actuating member with the piston including bearing means to permit relative rotation therebetween whereby the chuck is operated or released by application of fluid pressure to said cylinder, and a housing rigidly attached to said headstock at the rear thereof and enclosing the said cylinder and said connecting means, the said housing including a portion cooperating with the said connecting means to support the latter and provide an outboard bearing for said spindle.

3. A chuck operating mechanism for a machine tool having a headstock and a hollow spindle journalled therein with the spindle projecting beyond the front and rear of the headstock and with the forward end of the spindle equipped with a chuck, the said mechanism comprising a non-rotatable annular cylinder surrounding a part of the rear projecting portion of said spindle, an annular piston reciprocable in said cylinder, the said cylinder having ports on either side of said piston to permit the alternate introduction and exhaust of a fluid under pressure for effecting movement of the piston, a chuck actuating member extending through the bore of said spindle, means operatively connecting said member with said piston including bearing means to permit relative rotation therebetween, and a housing rigidly attached to said headstock at the rear thereof and enclosing the said cylinder and connecting means, the said housing including a portion cooperating with the first-mentioned means to provide a supporting bearing for the latter.

4. A chuck operating mechanism for a machine tool having a hollow spindle journalled in the headstock thereof with the forward end of said spindle equipped with a chuck and the rear end of said spindle projecting beyond said headstock, the said mechanism comprising a non-rotatable cylinder positioned at the rear of said headstock and coaxial with said spindle, a piston reciprocable in said cylinder, the said cylinder having ports on either side of said piston to permit the alternate introduction and exhaust of a fluid under pressure for effecting movement of the piston, a member connected to said spindle to rotate therewith and move axially with respect thereto, means connecting said member with said piston including bearing means to permit relative rotation therebetween, a chuck actuating member extending through the bore of said spindle, means operatively connecting said first-mentioned member with the chuck actuating member whereby the chuck is operated or released by application of fluid pressure to said cylinder, and a housing rigidly attached to said headstock at the rear thereof and enclosing the mechanism, the said housing including an internal surface slidably supporting the first-mentioned means whereby the said housing provides an outboard bearing for said spindle and mechanism.

5. A chuck operating mechanism for a machine tool having a hollow spindle journalled in the headstock thereof with the forward end of said spindle equipped with a chuck and the rear end of said spindle projecting beyond said headstock, the said mechanism comprising a non-rotatable annular cylinder surrounding the said projecting rear portion of said spindle, bearing means between said cylinder and spindle providing a support for said cylinder on said spindle and permitting relative rotation therebetween, an annular piston reciprocable in said cylinder, the said cylinder having ports on either side of said piston to permit the alternate introduction and exhaust of a fluid under pressure for effecting movement of the piston, a member connected to said spindle to rotate therewith and move axially with respect thereto, means connecting said member with said piston including bearing means to permit relative rotation therebetween, a chuck actuating member extending through the bore of said spindle, means operatively connecting said first-mentioned member with the chuck actuating member whereby the chuck is operated or released by application of fluid pressure to said cylinder, and means connected to said headstock and cooperating with said first-mentioned means to provide an outboard bearing for the latter and for said spindle.

6. A chuck operating mechanism for a machine tool having a hollow spindle journalled in the headstock thereof with the forward end of said spindle equipped with a chuck and the rear end of said spindle projecting beyond said headstock, the said mechanism comprising a non-rotatable annular cylinder surrounding the said projecting rear portion of said spindle, bearing means between said cylinder and spindle providing a support for said cylinder on said spindle and permitting relative rotation therebetween, an annular piston reciprocable in said cylinder, the said cylinder having ports on either side of said piston to permit the alternate introduction and exhaust of a fluid under pressure for effecting movement of the piston, a member connected to said spindle to rotate therewith and move axially with respect thereto, means connecting said member with said piston including bearing means to permit relative rotation therebetween, a chuck actuating member extending through the bore of said spindle, means operatively connecting said first-mentioned member with the chuck actuating member whereby the chuck is operated to gripping or releasing position by application of fluid pressure to said cylinder, and a housing rigidly attached to said headstock at the rear thereof and enclosing the mechanism, the said housing including an internal surface slidably supporting the means connecting said piston with the first-mentioned member and acting therethrough to provide an outboard bearing for said spindle.

7. In a machine tool having a headstock and a hollow spindle journalled therein with the spindle projecting beyond the front and rear of the headstock, the combination of a chuck on the forward end of the spindle, a non-rotatable annular cylinder surrounding a portion of the rear projection of said spindle, an annular piston reciprocable in said cylinder, the said cylinder having ports on either side of said piston to permit the alternate introduction and exhaust of a fluid under pressure for effecting movement of the piston, a member connected to said spindle to rotate therewith and move axially with respect thereto, means connecting said member with said piston including bearing means to permit relative rotation therebetween, a chuck actuating member extending through the bore of said spindle, and means operatively connecting the first-mentioned member with the chuck-actuating member, whereby movement of said piston in response to the application of fluid pressure to said cylinder is effective to operate said chuck to gripping or releasing position.

8. The combination as defined in claim 7 and in which said chuck is of the universal type, and the means operatively connecting the said first-mentioned member and the chuck-actuating member comprises a sleeve-like member mounted upon said first-mentioned member and rigidly connected with said actuating member.

9. The combination as defined in claim 7 and in which said chuck is of the push-out collet type and the means operatively connecting the said first-mentioned member and the chuck actuating member includes a plurality of levers pivoted to the projecting rear portion of said spindle with one arm of each of said levers adapted to be moved by said first-mentioned member and the other arm of each of said levers abutting said chuck actuating member to move the latter in chuck closing direction when the levers are rocked by said first-mentioned member.

10. The combination as defined in claim 7 and in which said chuck is of the draw-back collet type and the means operatively connecting the said first-mentioned member and the chuck actuating member includes a plurality of levers pivoted to the said actuating member with the outer portion of each of said levers adapted to be moved by said first-mentioned member and the inner portions of said levers abutting the rear extending portion of said spindle to act as fulcrums for said levers, whereby the levers shift the chuck actuating member in chuck closing direction when rocked by said first-mentioned member.

11. The combination as defined in claim 7 and further comprising a housing rigidly attached to said headstock at the rear thereof, the said housing including a portion slidably supporting the means which connects the piston with the first-mentioned member, thereby providing an outboard bearing for said spindle.

12. In a machine tool having a headstock and a hollow spindle journalled therein with the spindle projecting beyond the front and rear of the headstock, the combination of a collet chuck on the forward end of the spindle, a non-rotatable annular cylinder surrounding a portion of the rear projection of said spindle, an annular piston reciprocable in said cylinder, the said cylinder having ports on either side of said piston to permit the alternate introduction and exhaust of a fluid under pressure for effecting movement of the piston, a member connected to said spindle to rotate therewith and move axially with respect thereto, means connecting said member with said piston including bearing means to permit relative rotation therebetween, a chuck actuating member extending through the bore of said spindle, and means for transmitting axial movement of the first-mentioned member to said chuck actuating member including a plurality of levers adapted to be rocked by axial movement of said first-mentioned member with each of said levers having a portion acting upon said chuck actuating member whereby movement of said piston is effective to operate and release said chuck.

13. The combination as defined in claim 12 and wherein the collet chuck is of the push-out type and the said means which includes the levers for operating the chuck actuating member further includes a lever housing adjustably connected with the projecting portion of said spindle and having the said levers pivoted thereon with one arm of each of the levers engaging the chuck actuating member, and a reciprocable sleeve interposed between the other arms of the levers and a portion of said first-mentioned member whereby movement of the latter acts through said sleeve to rock said levers.

14. A combination as defined in claim 12 and in which said collet chuck is of the draw-back type and in which the means which includes the levers for operating the chuck actuating member further includes a lever housing adjustably mounted upon said actuating member with the said levers pivoted to said housing intermediate their ends, means carried by the projecting end of said spindle providing a fulcrum for each of said levers, and means connected with said first-mentioned member adapted to rock said levers about their fulcrums when the said first-mentioned member is moved by movement of said piston.

ARTHUR D. WETZEL.

REFERENCES CITED

The following references are of record in the file of this patent:

UNITED STATES PATENTS

| Number | Name | Date |
| --- | --- | --- |
| 1,014,773 | Rivett | Jan. 16, 1912 |
| 1,146,193 | Miller | July 13, 1915 |
| 2,362,146 | Mariotte | Nov. 7, 1944 |
| 2,375,115 | Kylin | May 1, 1945 |
| 2,392,999 | Redmer | Jan. 15, 1946 |
| 2,418,082 | Marasko | Mar. 25, 1947 |